US008262803B2

(12) United States Patent
Zorn et al.

(10) Patent No.: US 8,262,803 B2
(45) Date of Patent: Sep. 11, 2012

(54) METHOD AND TOOL FOR CLEANING CAVITIES

(75) Inventors: Christof Zorn, Korntal-Munchingen (DE); Ralf Grimme, Pleidelsheim (DE)

(73) Assignee: Fraunhofer-Gesellschaft zur Forderüng der Angewandten Forschung e.V., Munich (DE)

(*) Notice: Subject to any disclaimer, the term of this patent is extended or adjusted under 35 U.S.C. 154(b) by 531 days.

(21) Appl. No.: 11/995,643

(22) PCT Filed: Jun. 2, 2006

(86) PCT No.: PCT/EP2006/005290
§ 371 (c)(1), (2), (4) Date: Jun. 3, 2008

(87) PCT Pub. No.: WO2007/012364
PCT Pub. Date: Feb. 1, 2007

(65) Prior Publication Data
US 2009/0107523 A1  Apr. 30, 2009

(30) Foreign Application Priority Data

Jul. 25, 2005 (DE) .......................... 10 2005 034 634

(51) Int. Cl.
*B08B 7/00* (2006.01)
*B08B 7/04* (2006.01)
*B08B 9/00* (2006.01)

(52) U.S. Cl. ............... 134/22.18; 134/7; 134/8; 134/19; 134/26; 134/30; 134/93; 134/105; 134/108; 134/166 R

(58) Field of Classification Search .................. 134/19, 134/22.1, 22.18, 22.12, 26, 30, 31, 34, 7, 134/6, 93, 105, 108, 8, 166 R, 167 R
See application file for complete search history.

(56) References Cited

U.S. PATENT DOCUMENTS

| 5,482,211 A * | 1/1996 | Chao et al. ............... 239/135 |
| 5,509,431 A * | 4/1996 | Smith et al. .............. 134/95.1 |
| 5,823,863 A * | 10/1998 | Henneborn et al. .......... 451/449 |
| 5,853,128 A * | 12/1998 | Bowen et al. .............. 239/329 |
| 6,418,732 B1 * | 7/2002 | Klane et al. ............... 62/63 |
| 6,524,394 B2 * | 2/2003 | Okazawa et al. ............. 134/7 |
| 6,966,144 B2 * | 11/2005 | Eliasson et al. ............ 43/132.1 |
| 2002/0074022 A1 | 6/2002 | Loehr |
| 2003/0175626 A1 | 9/2003 | Ryza et al. |

(Continued)

FOREIGN PATENT DOCUMENTS

DE  4423188 A1  1/1996

(Continued)

OTHER PUBLICATIONS

PCT search report dated Jun. 19, 2008 from PCT/EP2006/005290.

(Continued)

*Primary Examiner* — Alexander Markoff
(74) *Attorney, Agent, or Firm* — Barnes & Thornburg LLP

(57) ABSTRACT

A method for cleaning cavities in workpieces, a cleaning device for this purpose and a device for the supply of media to a cleaning device of this type. Supercritical carbon dioxide is introduced into the cavity and the cavity is rinsed. The supercritical carbon dioxide located in the cavity is relieved of pressure after rinsing of the cavity, so that carbon dioxide gas and carbon dioxide snow are formed in the cavity and subsequently driven out of the cavity.

12 Claims, 3 Drawing Sheets

U.S. PATENT DOCUMENTS

Figure 1:
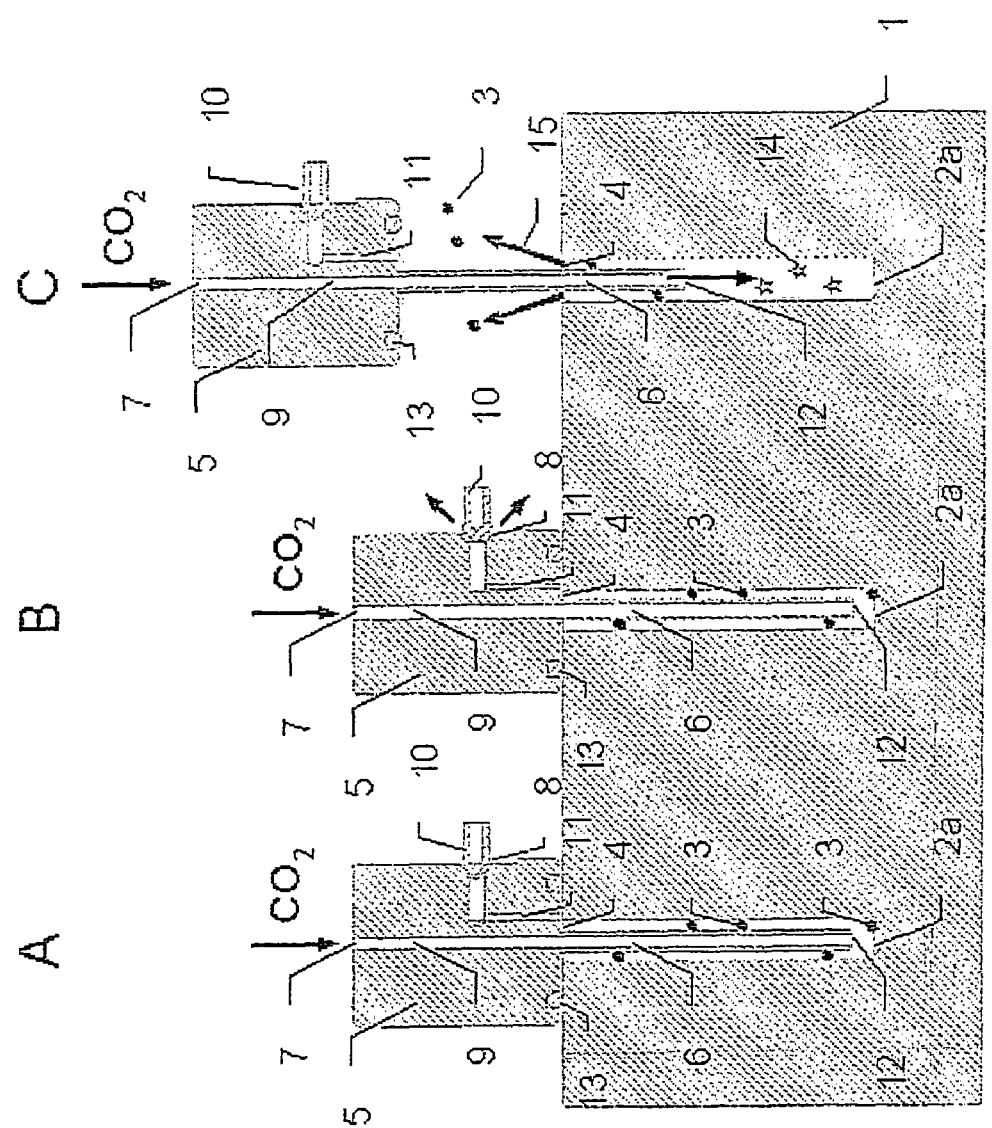

2004/0112406 A1* 6/2004 Cotte et al. ............ 134/4
2006/0124156 A1* 6/2006 Jackson ............ 134/99.1

FOREIGN PATENT DOCUMENTS

| | | |
|---|---|---|
| DE | 10055127 A1 | 11/2000 |
| DE | 10218519 C1 | 6/2003 |
| DE | 10311552 A1 | 10/2004 |
| DE | 10318238 A1 | 11/2004 |
| EP | 1503401 A1 | 2/2005 |
| JP | 59218300 | 12/1984 |
| WO | WO01/87505 A1 | 11/2001 |

OTHER PUBLICATIONS

International Search Report and Written Opinion for PCT/EP2006/005290 dated Sep. 14, 2006.

* cited by examiner

METHOD AND TOOL FOR CLEANING CAVITIES

CROSS REFERENCE TO RELATED APPLICATIONS

This application is the U.S. national phase of PCT/EP2006/005290 filed Jun. 2, 2006. PCT/EP2006/005290 claims the benefit under the Paris Convention of the Jul. 25, 2005 filing date of German patent application DE 10 2005 034 634.0. The disclosures of both of DE 10 2005 034 634.0 and PCT/EP2006/005290 are hereby incorporated herein by reference.

FIELD OF THE INVENTION

The present invention relates to a method for cleaning cavities in workpieces and to a cleaning device for this purpose. Methods and devices of this type are required in particular for cleaning cavities, such as borings, blind holes and the like, of particulate and/or film-like impurities. They are used in particular in the field of mechanical engineering in the automobile industry.

The cleaning of cavities, such as borings or blind holes, places particular requirements on the cleaning process. In particular in the case of high aspect relationships, i.e. in the case of a small diameter of the cavity with a large depth, the problem exists of removing for example manufacturing-related impurities, such as particles (chips and the like) and greases, before further processing.

Various methods are available for this purpose in prior art.

On the one hand, compressed air can be blown into the boring by means of compressed air lances. As a result, chips and oils are then removed from the boring. It is a disadvantage in this respect that this cleaning method cannot be used with great success for removing fine oil layers or particles with a diameter <1 µm.

Alternatively, the boring can be rinsed with a liquid at high pressure. There are thereby possible as media, in particular media on an aqueous basis or hydrocarbon basis. If the cavities are rinsed out in this manner, drying is subsequently required. Furthermore, secondary waste occurs, such as slurries with washing media residues or contaminated waste water which must be disposed of or reprocessed. Particular measures are also required with this method to maintain the permitted maximum concentrations at the workplace (MAK values).

The cleaning effect can be extended further in that the component is immersed in a cleaning bath and the cleaning effect is assisted by using ultrasound. However, the cleaning effect of ultrasound decreases greatly in borings since the ultrasonic energy reaches the boring interior only in a restricted manner as a function of the component material. With a bath solution of this type, impurities dissolved in the boring are also not conveyed away adequately. As also in the case of rinsing with liquids, in addition drying is required subsequently.

A further method from prior art likewise uses $CO_2$ snow. With the help of a two-material nozzle, liquid $CO_2$ is relieved of pressure and the resulting ice crystals are accelerated almost to the speed of sound via a further gas, such as for example nitrogen or air. As a result, the resulting $CO_2$ ice crystals at almost the speed of sound strike the surface of the cavity to be cleaned and remove above all the particles situated on the surface because of the impulse transmission.

It is disadvantageous in this respect that, in order to accelerate the ice crystals, a Laval nozzle, i.e. an expensively formed complex component, is required. This enlarges the constructional form and increases the consumption costs so that a $CO_2$ probe of this type is not suitable for cleaning borings and blind holes with a small diameter, e.g. $\leq 20$ mm. It is also disadvantageous in addition that the thus blasted particles accumulate possibly subsequently again on the inner wall (cavity). Also the removal of greases or oils is not ensured by using $CO_2$ snow.

In turn, the use of supercritical $CO_2$ which is an excellent solvent for greases and oils overcomes this disadvantage. For this purpose, a pressure chamber is used as $CO_2$ bath. This chamber is flooded with supercritical $CO_2$ under high pressure (>73 bar). This supercritical $CO_2$ penetrates into the borings of workpieces which are placed in the chamber and removes the greases and oils excellently from the boring. However complete conveying away of particles and chips in the $CO_2$ bath does not take place since, in the supercritical state, $CO_2$ has too low a viscosity.

DE 102 18 519 C1 describes a method for cleaning objects in a pressure container by means of a compressed gas, which is compressed and decompressed successively once or several times. As a result, particulate and other impurities can be removed from depressions, blind holes or open cavities in objects.

US 2003/0175626 A1 describes a method and a device for removing impurities on a substrate. The substrate is hereby sprayed with a supercritical liquid, such as e.g. supercritical CO2. The impurities are then dissolved in the supercritical liquid and are removed from the supercritical liquid after the cleaning process in that the supercritical liquid is cooled in its liquid state.

US 2004/0112406 A1 describes a method and a device for removing solid and liquid residues from electronic components, such as e.g. semiconductor wafers, liquid or supercritical carbon dioxide likewise being used.

DE 103 18 238 A1 describes a device for cleaning the inner faces of threaded borings, a blowing insert with a longitudinal section being introduced into the thread and subsequently a cleaning medium being introduced under pressure into the blowing insert. The cleaning medium then emerges with spin out of the longitudinal opening and removes impurities or particles adhering in the thread.

It is therefore the object of the present invention to make available a method and a device with which impurities such as particles or greases/oils can be removed from cavities.

This object is achieved by the method according to claim 1 and the device according to claim 8. Advantageous developments of the method according to the invention and also of the device according to the invention are provided in the respective dependent claims.

According to the invention, the method for cleaning cavities in workpieces takes place in several stages. First of all supercritical carbon dioxide is introduced into the cavity and the cavity is rinsed with this supercritical carbon dioxide. As a result of this step, degreasing of the cavity is effected in particular. The introduction of the supercritical carbon dioxide can be effected for example via a lance. It is hereby crucial that, between the element for introducing the supercritical carbon dioxide into the cavity (the cleaning device) and the workpiece, a very good seal must be effected around the opening of the cavity since $CO_2$ becomes supercritical only at a pressure >73.8 bar (critical pressure) with at the same time a temperature of >31° C. (critical temperature).

Subsequent to the rinsing, the supercritical $CO_2$ is now relieved of pressure in the cavity. This can be effected for example by opening a valve or opening the seal. As a result of this relaxation, carbon dioxide snow is formed in the cavity from the supercritical $CO_2$ and is expelled from the cavity because of the gas expansion. By means of the carbon dioxide snow, particles on the inner surface of the cavity are also detached and are blown out together with the $CO_2$ snow.

The method according to the invention concerns a special form of rinsing with supercritical $CO_2$ in combination with subsequent production of $CO_2$ snow from the introduced liquid or supercritical $CO_2$.

It is crucial with the present method therefore that it avoids the disadvantages of a bath solution in supercritical $CO_2$, known from prior art. Rather the advantages here of the solvent properties of supercritical $CO_2$ with the detachment properties with respect to particles of $CO_2$ snow are associated with each other.

As a result of this method, cavities with a diameter <1 mm can be both degreased and cleaned of particles. It is possible to clean cavities with almost any high aspect relationships without a subsequent operation, such as for example drying, being subsequently required. In fact, the $CO_2$ contained in the cavity finally sublimates entirely. Since neither an aqueous nor an organic solvent was introduced into the cavity either, no corrosion takes place subsequently in the cavity either.

The solvent and abrasive $CO_2$ itself is non-toxic, non-combustible but very easily available at low cost. Protective measures, such as for example emission protection or explosion protection are therefore not required. No waste is produced so that also no disposal of the solvent is required either.

It is possible furthermore to separate the separated impurities (oils, greases and particles) from the $CO_2$. The entire method hence also enables recovery of the $CO_2$ (increased cost savings and environmental friendliness). This is of interest above all for automated application.

Advantageously, the blowing out of the carbon dioxide snow is effected with further supplied carbon dioxide or with another gas, such as for example nitrogen or compressed air. If further carbon dioxide, in particular liquid carbon dioxide, is introduced into the cavity, then also further $CO_2$ snow can be produced at the same time.

In order to keep the $CO_2$ in the workpiece in the supercritical state in the first step, the workpiece can also be heated, for example by a furnace, a heating plate, a hot air blower or even an infrared radiator.

Advantageously, a cleaning device is used for the method according to the invention which has an outlet for $CO_2$ which, for its part, can be sealed very well on the workpiece. As a result, it is possible to introduce supercritical $CO_2$ from the cleaning device at high pressure into the cavity of the workpiece. The cleaning device can have a lance which has at least one outlet element of this type for the cleaning medium $CO_2$ at the end thereof. The outlet elements can also be disposed laterally on the circumference of the lance in order for example to clean threads disposed in the cavity completely when withdrawing the lance.

Also the media supply device according to the present invention has a special configuration in that it has not merely a supply for supercritical $CO_2$ to the cleaning device and into the cavity. Rather the supercritical $CO_2$ is produced in fact, as in prior art, by compression and heating of the $CO_2$ removed from a container. This region can however be bypassed also via a bypass pipe so that the cleaning device can be supplied alternatively also with liquid or gaseous $CO_2$ instead of with supercritical $CO_2$. As a result, the blowing of the $CO_2$ snow produced from supercritical $CO_2$ out of the cavity is possible subsequent to rinsing with the supercritical $CO_2$.

Advantageously, it is also possible, for cleaning even heavier contamination, to repeat the cleaning process as described above cyclically.

Figure 2:
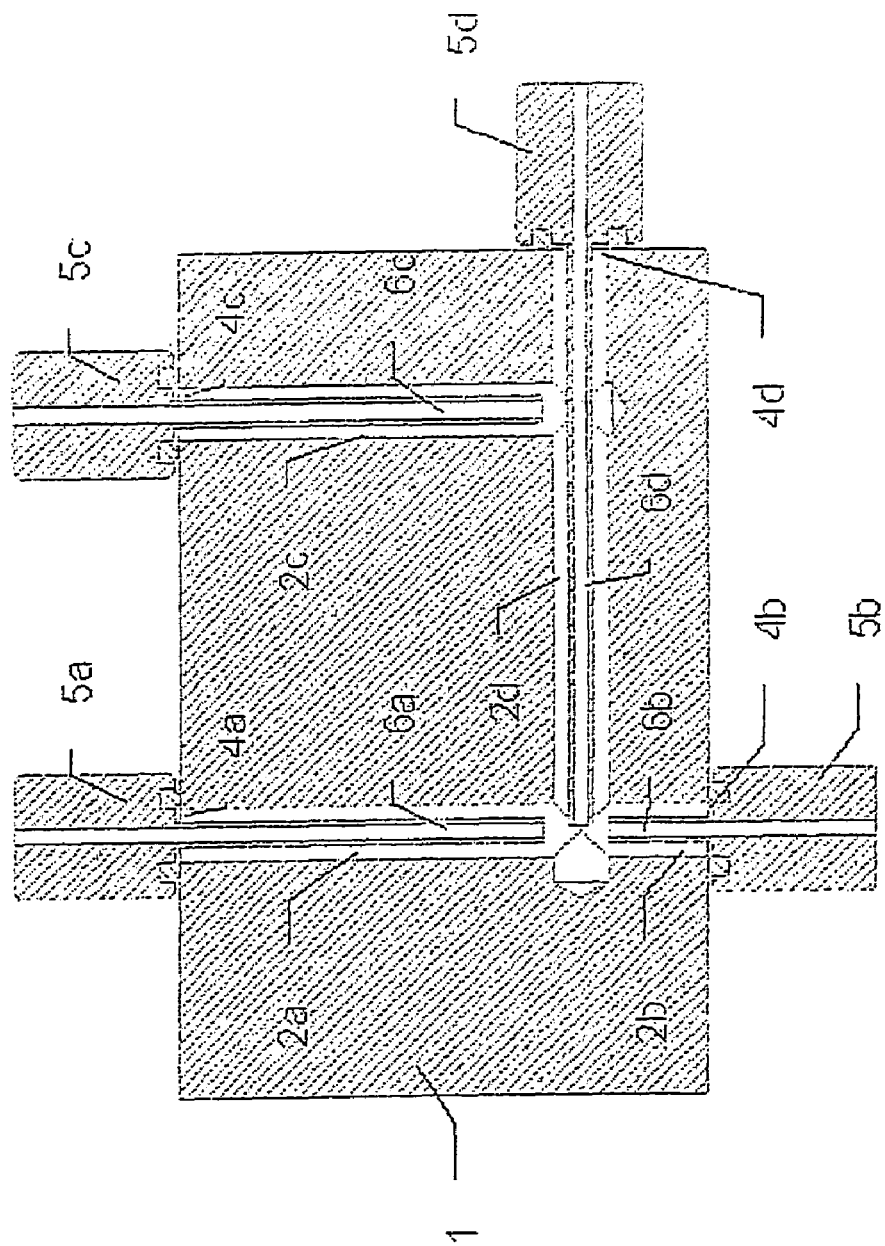
Figure 3:
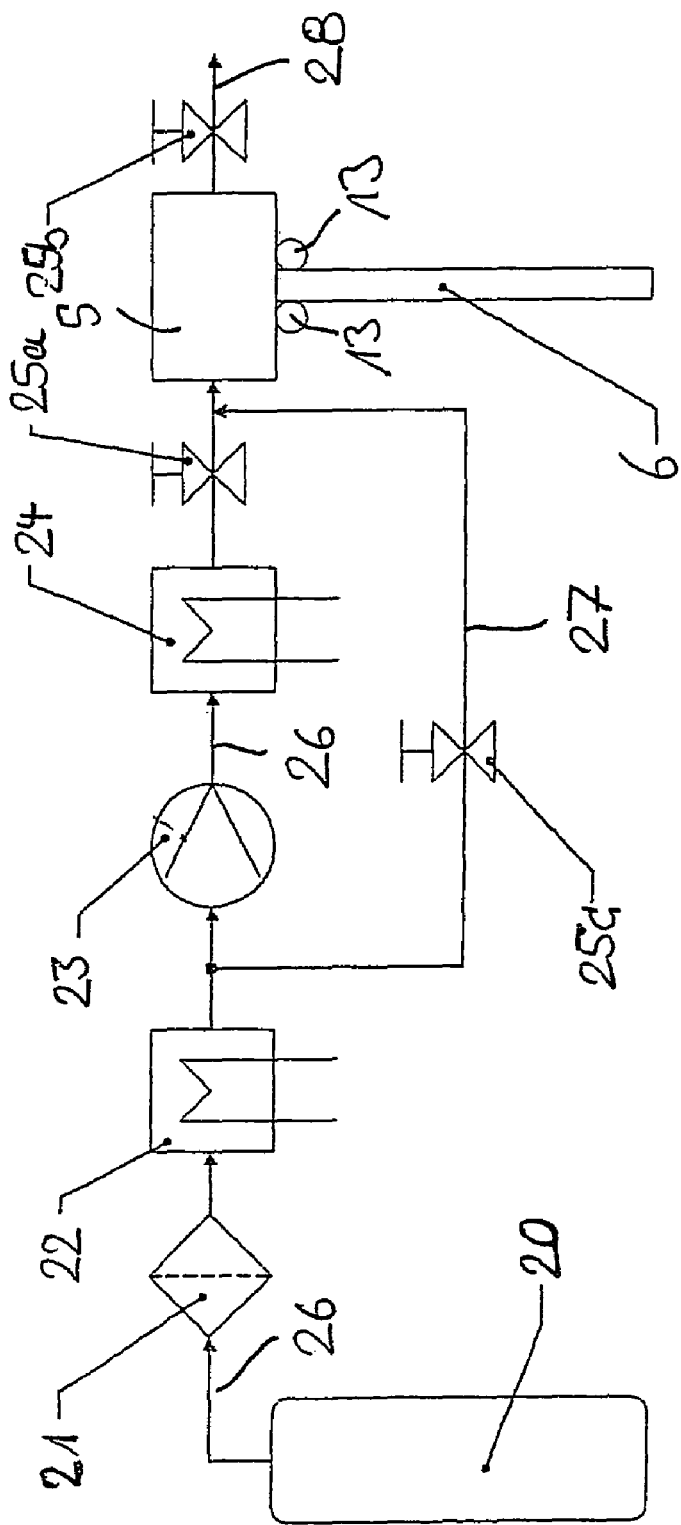

Examples of the method according to the invention, of the cleaning device according to the invention and of the media supply according to the invention are described subsequently. There are shown:

FIG. 1 three stages of a cleaning method according to the invention and also a cleaning tool;

FIG. 2 a method according to the invention for cleaning cavities with a plurality of openings; and FIG. 3 the diagram of a media supply system according to the invention.

In the partial pictures A, B and C, FIG. 1 shows three steps for cleaning a cavity 2a (boring) in a workpiece 1. Impurities 3 of a particulate type are represented in FIG. 1A in the cavity 2a. The cavity has an opening 4 on the surface of the component 1. A cleaning tool 5 according to the invention is now placed upon this opening 4 and sealed by means of a circumferential seal 13 on the workpiece 1. The tool 5 has a lance 6 which has an opening 12 on the lance end thereof. Supercritical $CO_2$ can now be conducted to the opening 12 via the pipe 9 via an opening 7 and can be introduced from there into the cavity 2a. Furthermore, the tool 5 has a boring 11 which is connected to an outlet 8 via a valve 10. In the cleaning phase which is represented in FIG. 1A, the valve 10 is closed so that the cavity 2a is flooded with supercritical $CO_2$ fluid.

In FIG. 1B, the rinsing process with supercritical $CO_2$ is now represented since the valve 10 is opened so that under still sufficiently high pressure, the cavity 2a is rinsed with supercritical $CO_2$. The supercritical $CO_2$ thereby runs through the pipe 9 into the cavity 2a and there removes greases and oils. The supercritical $CO_2$, because of its low viscosity, can only remove particulate deposits from the cavity inadequately. Subsequently, the supercritical $CO_2$ flows via the boring 11 and the valve 10 towards the outlet 8. There, it can be collected again for example.

In the further step according to the present invention which is represented in FIG. 1C, the cleaning tool 5 is withdrawn from the boring 2a. As a result, the supercritical $CO_2$ is relieved of pressure so that $CO_2$ snow is produced which, when flowing out of the cavity 2a as a $CO_2$ jet 15, entrains the particulate impurities 3 with it and removes them from the cavity 2a.

Furthermore, it is represented in FIG. 1C that now for example supercritical liquid or also gaseous $CO_2$ is introduced into the cavity via the lance 6 and is converted there into $CO_2$ snow. As a result, the previously supercritical $CO_2$ is blown out of the cavity 2a and at the same time blasts the cavity further with $CO_2$ snow 14. During removal of the cleaning tool 5 from the cavity 2a, the inner peripheral surface of the cavity can be further cleaned by continuous introduction of $CO_2$ or $CO_2$ jets.

If $CO_2$ nozzles are disposed for this purpose laterally on the circumference of the lance 6, then pure $CO_2$ blasting can be effected.

FIG. 2 shows an example of the use of in total four cleaning tools 5a, 5b, 5c and 5d on the openings 4a, 4b, 4c and 4d of the cavities 2a, 2b, 2c, 2d, which are in communication with each other, on the surface of the workpiece 1. Here as in the following, the same or similar reference numbers are used for the same and similar elements as in FIG. 1.

With the method according to the invention, also simultaneous cleaning of a plurality of cavities which are possibly connected to each other is therefore possible, for example of a channel system of a valve block. The cleaning of the cavities can thereby be effected simultaneously or coordinated to each other. Also the use of respectively adapted cleaning tools which can be actuated simultaneously or also successively for each individual boring is possible. In particular, one of the cleaning devices 5a, 5b, 5c or 5d or a plurality of these cleaning devices can also be replaced readily by blind stoppers. It is merely relevant that the cavity system can be maintained under pressure, which enables rinsing with supercritical $CO_2$.

The $CO_2$ laden with greases or particles after cleaning can subsequently be cleaned easily by filtration or precipitation and be supplied again into the circulation of the cleaning unit. In the case of filtration, the particulate impurities located in the cleaning medium are separated from the liquid and/or from the gaseous state by means of a filter. An alternative to filtration is represented for example by precipitation. The cleaning medium is hereby relieved of pressure until it is present in gaseous form. As a result, separation of the particulate or dissolved materials from the cleaning medium which is transferred into the gaseous state is also effected.

FIG. 3 shows a media supply system for a cleaning device 5. The cleaning device 5 is likewise represented in FIG. 3 with a lance 6 and with an annular seal 13 which are present in this example. The media supply system of FIG. 3 can also be regarded itself as part of the cleaning device.

In the case of the cleaning device according to the invention, there are disposed in succession via a pipe 26 a supply container for $CO_2$ (gas cask), a filter 21 for cleaning the $CO_2$, a cooling unit 22 for cooling the $CO_2$, a high pressure pump 23 for increasing the pressure of the $CO_2$ to a supercritical pressure, a heating device 24 (heating stretch) for increasing the temperature of the $CO_2$ to a supercritical temperature, a check or volume flow control valve 25a, the cleaning device 5 and a further check or volume flow control valve 25b. Via this pipe length, it is therefore possible to introduce supercritical $CO_2$ into the lance 6.

According to the invention, a bypass pipe is disposed around the high pressure pump 23, the heating stretch 24 and the valve 25a. This pipe 27 for its part has a check or volume flow control valve 25c.

If now the valve 25a and at the same time the valve 25b is opened, then supercritical $CO_2$ flows through the lance and through the cavity, not shown here, back to the valve 25b (corresponding to the valve 10 in FIG. 1) for rinsing the cavity.

According to the invention, the media supply device has a bypass pipe 27 which bypasses the high pressure pump 23 and the heating stretch 24 and also the valve 25a. It is provided with a valve 25c for blocking or controlling the volume flow. Via this pipe 27, gaseous $CO_2$ can be introduced now when the valve 25c is opened (and at the same time valve 25a is closed) or $CO_2$ converted into the liquid state via the cooling device 22 can be introduced into the cleaning device 5 and the lance 6. If the cleaning device 5 with its seals was removed in advance from the workpiece so far that a supercritical pressure no longer prevails in the cavity, which is not shown here, then now the supercritical $CO_2$ or the snow produced therefrom can be blown out of the cavity with the gaseous or liquid $CO_2$. Further cleaning and in particular blasting of the cavity with $CO_2$ snow can be effected by further introduction of liquid $CO_2$.

The invention claimed is:

1. A method for cleaning cavities in workpieces, wherein in a first stage supercritical carbon dioxide being introduced into the cavity by means of a cleaning device and the cavity being rinsed with the supercritical carbon dioxide, and in a further stage the supercritical carbon dioxide located in the cavity being relieved of pressure after rinsing of the cavity so that carbon dioxide gas and snow are formed in the cavity and subsequently driven out of the cavity, wherein at least during the first stage a sealing between the cleaning device and the workpiece around the opening of the cavity is effected.

2. The method according to claim 1 wherein a further fluid is introduced into the cavity for blowing out the carbon dioxide snow.

3. The method according to claim 2 wherein at least one of a gas, gaseous, liquid and supercritical carbon dioxide, molecular nitrogen and compressed air is used as the further fluid.

4. The method according to claim 2 wherein at least one of gaseous, liquid and supercritical carbon dioxide is introduced as the further fluid such that further carbon dioxide snow is formed in the cavity.

5. The method according to claim 1 wherein the workpiece to be cleaned is heated.

6. The method according to claim 5 wherein the workpiece to be cleaned is heated with at least one of a furnace, a heating plate, a hot air blower and an IR radiator.

7. A device having a device for the supply of media to a cleaning device with fluid carbon dioxide as a cleaning medium, the device for the supply of media to a cleaning device with fluid carbon dioxide as a cleaning medium having a supply container for carbon dioxide, a fluid outlet which can be connected to the cleaning device and is connected to the supply container via a fluid pipe, a cooling unit which is disposed in the fluid pipe after the supply container, a high pressure pump which is disposed in the fluid pipe for producing a high operating pressure of the cleaning medium in the fluid pipe, a heating unit which is disposed in the fluid pipe after the cooling unit, and also a first controllable valve which is disposed in the fluid pipe, and a fluid bypass pipe around at least one of the pump and the heating device, said bypass pipe having a second controllable valve and said bypass pipe allowing $CO_2$, to be introduced into the cleaning device without passing the at least one of the pump and the heating device, the device further having the cleaning device for cleaning a cavity in workpieces with an inlet and an outlet for a cleaning medium, the inlet being connected to the device for the supply of media, the cleaning device having a lance having at least one outlet element which is suitable for introducing supercritical, liquid or gaseous $CO_2$, into the cavity to be cleaned and converting it there into $CO_2$ snow as a $CO_2$ jet, the cleaning device further having a seal surrounding the lance.

8. The device according to claim 7 wherein the bypass pipe includes a first end and a second end, and is connected by its first end at a first connection point in front of at least one of the pump and the heating device to the fluid pipe and, is connected by its second end, at a second connection point behind at least one of the pump and the heating device to the fluid pipe.

9. The device according to claim 8 wherein the first valve is disposed in the fluid pipe between the first and the second connection point.

10. The device according to claim 7 further including a seal for sealing between the outlet and the workpiece to be cleaned.

11. The device according to claim 7 wherein the outlet has at least one outlet element for the cleaning medium.

12. The device according to claim 7 wherein the lance has outlet elements in the region of its end in at least one of the axial direction and the lateral direction on its surface which extends along the axis thereof.

* * * * *

UNITED STATES PATENT AND TRADEMARK OFFICE
CERTIFICATE OF CORRECTION

| | | |
|---|---|---|
| PATENT NO. | : 8,262,803 B2 | Page 1 of 1 |
| APPLICATION NO. | : 11/995643 | |
| DATED | : September 11, 2012 | |
| INVENTOR(S) | : Zorn et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 620 days.

Signed and Sealed this
Twenty-ninth Day of December, 2015

Michelle K. Lee
*Director of the United States Patent and Trademark Office*